United States Patent [19]

Bettencourt et al.

[11] Patent Number: 4,570,426
[45] Date of Patent: Feb. 18, 1986

[54] TOMATO HARVESTER WITH IMPROVED SEPARATION OF TOMATOES FROM OTHER PICKED UP MATERIAL

[75] Inventors: Darryl G. Bettencourt, Lodi; Thomas S. Bettencourt, Isleton, both of Calif.

[73] Assignee: Blackwelders, Rio Vista, Calif.

[21] Appl. No.: 636,608

[22] Filed: Aug. 1, 1984

[51] Int. Cl.⁴ ............................................. A01D 45/00
[52] U.S. Cl. .................... 56/327 R; 171/13; 171/27
[58] Field of Search .............. 56/327 R; 171/13, 26, 171/27, 28, 36, 37, 38, 39, 40, 62

[56] References Cited

U.S. PATENT DOCUMENTS

| | | | |
|---|---|---|---|
| 1,771,447 | 7/1930 | Rice | 171/13 |
| 3,252,464 | 5/1966 | Hill et al. | 56/327 R |
| 3,420,239 | 1/1969 | Lorenzen | 171/27 |
| 3,986,561 | 10/1976 | Bettencourt et al. | 171/14 |
| 4,033,099 | 7/1977 | Friedel et al. | 56/372 R |
| 4,060,133 | 11/1977 | Bettencourt et al. | 171/1 |
| 4,088,570 | 5/1978 | Bettencourt | 209/396 |
| 4,111,210 | 9/1978 | Freeman et al. | 130/30 R |
| 4,118,311 | 10/1978 | Friedel et al. | 209/75 |
| 4,147,014 | 4/1979 | Cortopassi et al. | 56/327 R |

Primary Examiner—Robert P. Swiatek
Assistant Examiner—David I. Tarnoff
Attorney, Agent, or Firm—Owen, Wickersham & Erickson

[57] ABSTRACT

A tomato harvester of the type having a main frame and acting to sever the tomato plants below ground and to pick up and elevate them to a tomato separator for separating the tomatoes from the vines. A low elevator segment is separated from an upper elevator segment to provide a gap between them through which dirt clods and some loose tomatoes can fall. The length of the gap is adjustable by moving the upper segment relative to the lower one. The separator includes a walking bar type of shaker with vine retarding tines above the walking bars, and the tines are rotatable and ganged for movement up and down, to adjust dwell time in the separator. The crankshaft for the walking bars has crank pins alternating at 180° and has at each end a pair of timing journals extending at 90° to the crank pins to which the walking bars are secured. The outside journals are located 180° out of phase with the two journals mounted inwardly thereof, to provide two force couples in balance. Balance is completed by a counterweight secured to the crankshaft at each end to provide a force couple equal to and opposite from the force couple resulting from the crank pins.

4 Claims, 12 Drawing Figures

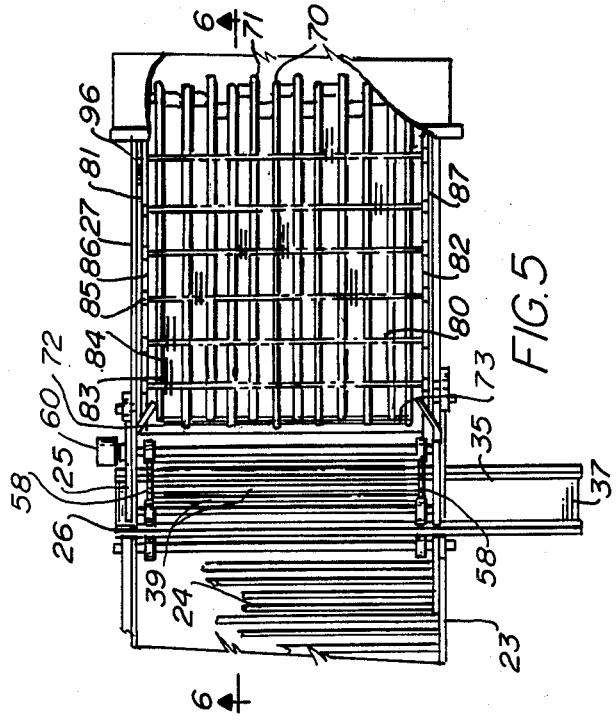
FIG. 5
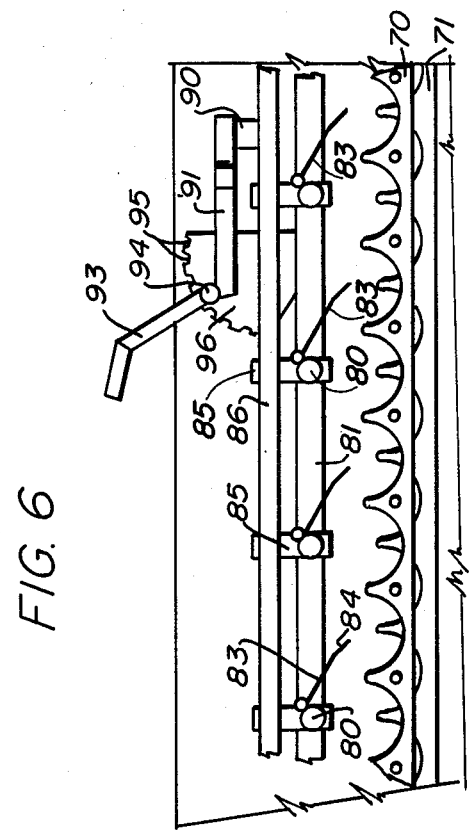
FIG. 6
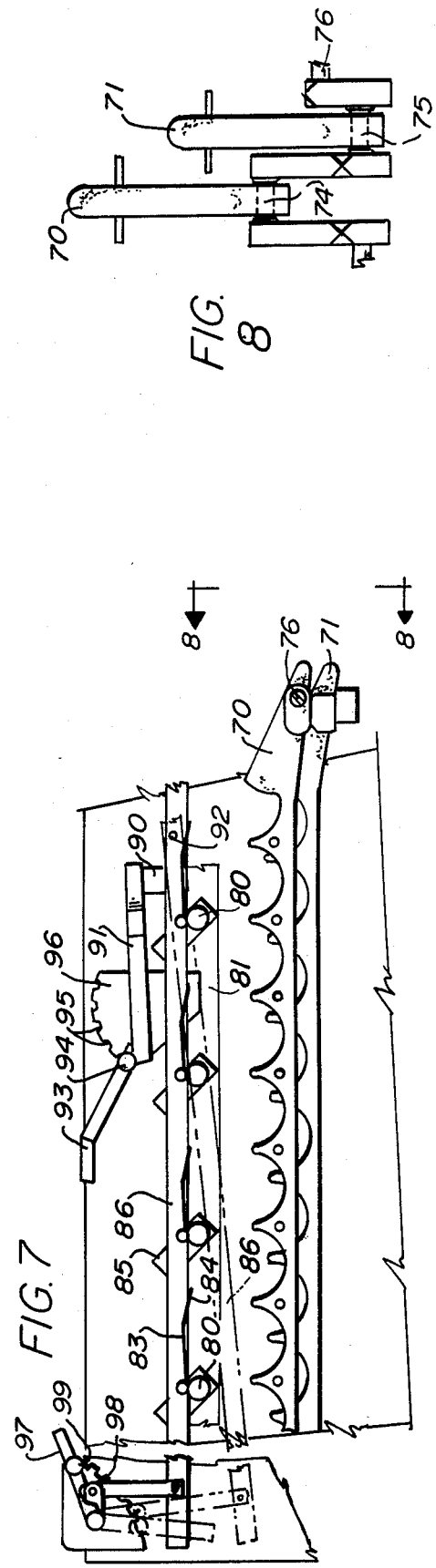
FIG. 8
FIG. 7

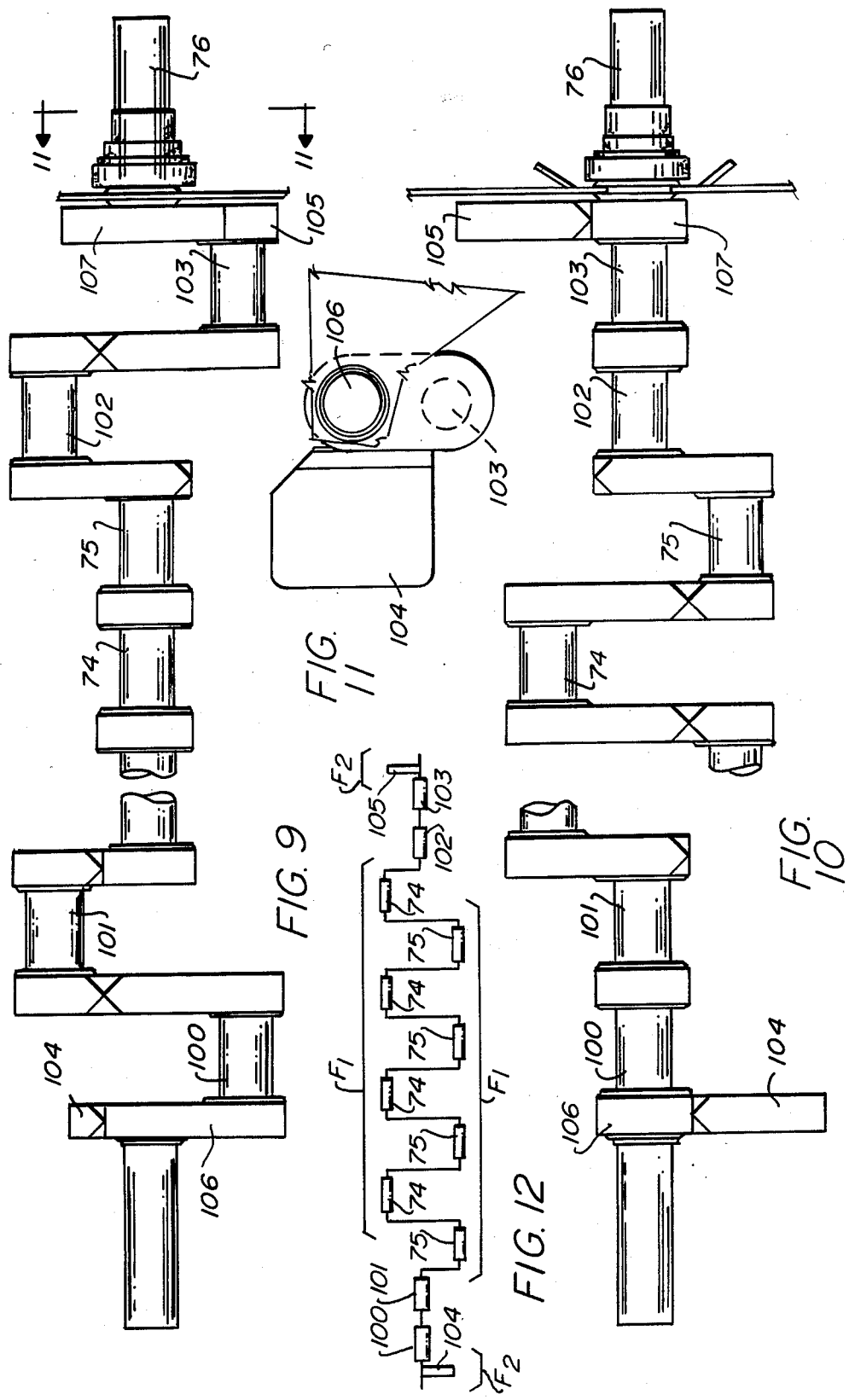

TOMATO HARVESTER WITH IMPROVED SEPARATION OF TOMATOES FROM OTHER PICKED UP MATERIAL

This invention relates to an improved tomato harvester in which the separation of the tomatoes from other picked-up material is removed.

BACKGROUND OF THE INVENTION

Tomato harvesters mechanically harvest by moving through a row of growing tomato plants, severing the plants below ground and picking up the severed plants along with their tomatoes, and also, picking up loose tomatoes and dirt. The loose dirt is returned to the ground in most cases quite readily, but the dirt clods accompany the vine and fruit up the elevator. Before reaching the shaker, the fruit passes over a gap between a lower segment of the elevator and an upper segment. Into this gap fall the dirt clods. The vines and fruit, except for some loose fruit which falls off with the dirt clods and which is afterwards recovered, continues with the upper segment of the elevator into the separator. There, walking bars are arranged in two sets 180° out of phase and are moved by a crankshaft at the rear end of the harvester, being pivotally mounted at the front end of the shaker. The crankshaft provides a shaking action which separates the tomatoes from the vines. The tomatoes fall down onto a collecting conveyor below the shaker, while the vines are propelled out the rear of the machine. Above the walking bars are positioned a series of tines, so mounted as to retard the progress of the vines through the machine, and thereby submit them to somewhat more shaking than they would get if they were simply bounced along and cast out prematurely before all the tomatoes were recovered. For that reason these mounted tines are often referred to as vine retarders.

The invention addresses three main problems. The first has to do with the freeing of the vines and fruit from the clods at the gap referred to above. Depending on the weather conditions and the soil conditions, the sizes of the clods vary. Sometimes they are quite large and sometimes they are small. Heretofore, there has been no efficient system for rapidly adjusting the spacing at the gap through which the clods fall onto the cod conveyor. It may be possible in some machines to make such an adjustment by a major remounting of certain of the machine parts, but this takes time and is inconvenient. Certainly it has not been possible heretofore to make the change rapidly in the field or to make changes rapidly as the machine moves from one part of the field to another.

One general object of the present invention is to provide ready adjustment of the spacing apart of the two elevator segments above and below the the clod-receiving gap, enabling rapid adjustment at any time, even during the operation of the harvester.

A second problem relates to the vine retarders. According to growth conditions of the vines and some other factors, it has sometimes been found that the angles at which the tines are placed may be ideal under some harvesting conditions, and far from ideal under others. Here again, the vine retarders have not been readily adjustable. They could be taken out and reinstalled at a different angle, but this does not solve the problem of harvesting, when, perhaps, even in different parts of the same field the conditions may be different.

It is therefore another general object of the invention to provide for ready and rapid adjustment of the vine retarding tines, to adapt them to changing conditions, both as to their angle of inclination and as to their nearness to the walker bars of the separator.

The third problem to which this invention is directed, is to obtain better balanced operation of the crankshaft for the walking bars of the shaker unit. As stated earlier, the bars are pivotally mounted at their forward ends and are connected to the crankshaft at their rear ends. The connection to the crankshaft might seem to be a simple thing, but the fact is that there tends to be a drastic unbalance on the shaft itself which sets up lateral conditions that can result in vibrations and movements which tend to be destructive of the machine. The reasons for this unbalance will be explained in detail later.

It is therefore another general object of this invention to improve the balance of the crankshaft to provide for more efficient operation of the walking bars without setting up conditions destructive to the machine.

Other objects and advantages of the invention will appear from the following description of the machine, both in general and in a specific embodiment.

SUMMARY OF THE INVENTION

The invention provides for readily and rapidly adjusting the spacing between the two segments of the elevator at the gap through which the clods fall. So far as the present invention is concerned, there is no difference otherwise between the clod system of this invention and that of some other systems currently in use. The clod conveyor transports the clods and any loose tomatoes that fall through the gap to an upwardly inclined conveyor which deposits them at a location where properly recoverable tomatoes can be removed, and then the clods themselves are dropped on the ground.

What is new in this invention is that the upper elevator segment can be moved fore and aft of the machine to widen and narrow the gap between it and the lower elevator segment. This is done by means of a swingable handle mounted on the frame of the shaker and a connection system between that handle and the specially mounted frame of the upper elevator segment.

The invention also solves the vine retarder problem by a frame providing a series of cross shafts above the walking bars of the shaker. On each cross shaft are mounted a plurality of vine-retarding tines. In the present invention, the cross shafts are all mounted on each side to a gang bar, which is itself mounted for rotary movement relative to a control bar. A first handle and cog arrangement mounted on the shaker, preferably on the opposite side of the harvester from the gap-adjusting handle, is connected to move the control bar fore and aft and thereby to generate a rotary movement of the gang bar. As a result, there is a rotary movement of the vine retarder tines, so that they can be moved between a substantially horizontal position to a position where they project downwardly at, say, 30 or 40 degrees. A second handle moves the forward portion of the gang bar up and down to bring most of the vine retarding tines closer to the walker bars of the separator. Both of these adjustments can be done readily and even while the machine is operating, so that the vine retarders can be suited to changing conditions even while the machine is in actual operation.

As in the prior art, the crankshaft is provided with two alternating series of crank pins, 180° apart; to each series of crank pins are mounted walking bars. At each end is a timing journal. It is necessary to employ timing journals in order to keep the crank rotating in one direction constantly rather than reciprocating. Heretofore, the two timing journals formed a single force couple that needed to unbalance the crankshaft.

Formerly, the crank was balanced in relation to rotational axis, but it was out of balance because of the force couple developed by the timing journal, so that the ultimate result was to make the crank unbalanced, and therefore producing non-useful, destructive vibrations. In the new crank of the present invention, balance is achieved by two equal and opposite force couples, and all the forces are balanced in relation to the rotational axis with an equal and opposite force.

Thus, in the present invention, there are two timing journals at each end, and these four journals are used to form the two equal and opposite force couples. also, counterweights have been added to each force couple. Each force couple has one timing journal on one end of the crank and another at the other end of the crank.

BRIEF DESCRIPTION OF THE DRAWINGS

In the drawings:

FIG. 5 is a fragmentary top plan view of the separator showing some vine retarders.

FIG. 6 is a fragmentary enlarged view in side elevation and in section along the line 6—6 in FIG. 5, showing the vine retarders in a lower position.

FIG. 7 is a similar view showing the vine retarders in an upper position.

FIG. 8 is a fragmentary plan view of a portion of the crank, viewed along the line 8—8 in FIG. 7.

FIG. 9 is a top plan view of the crank broken near one end, so that most of the crank is not shown.

FIG. 10 is a similar view in rear elevation of the crank.

FIG. 11 is an enlarged fragmentary view of a portion of the crank showing one of the journal members and its accompanying counterweight.

FIG. 12 is a diagrammatic representation of the complete crankshaft, disposed as shown in FIG. 11 but on a reduced scale, to show some of the pertinent force couples.

DESCRIPTION OF A PREFERRED EMBODIMENT

Figure 1:
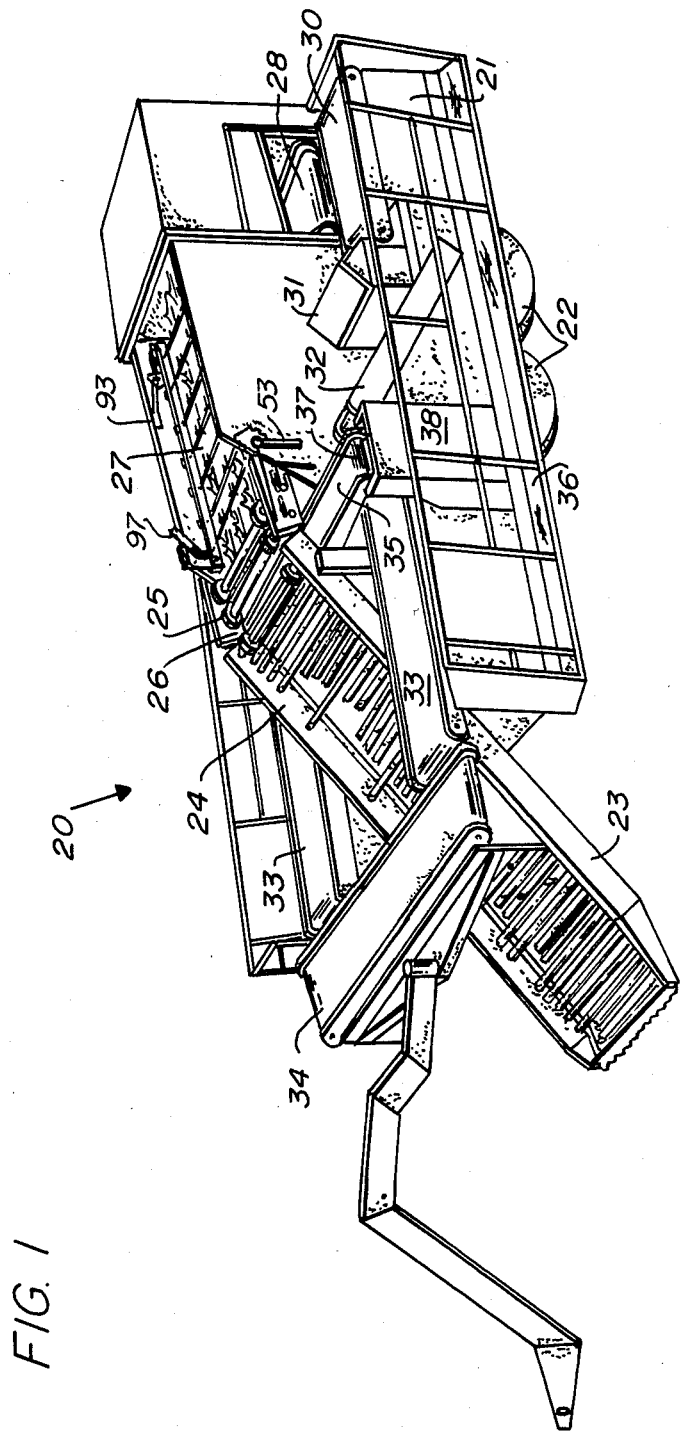
FIG. 1 is a view in perspective of a tomato harvester embodying the principles of the invention. The harvester shown is of the towed type, but the invention applies equally to self-propelled harvesters.
Figure 2:
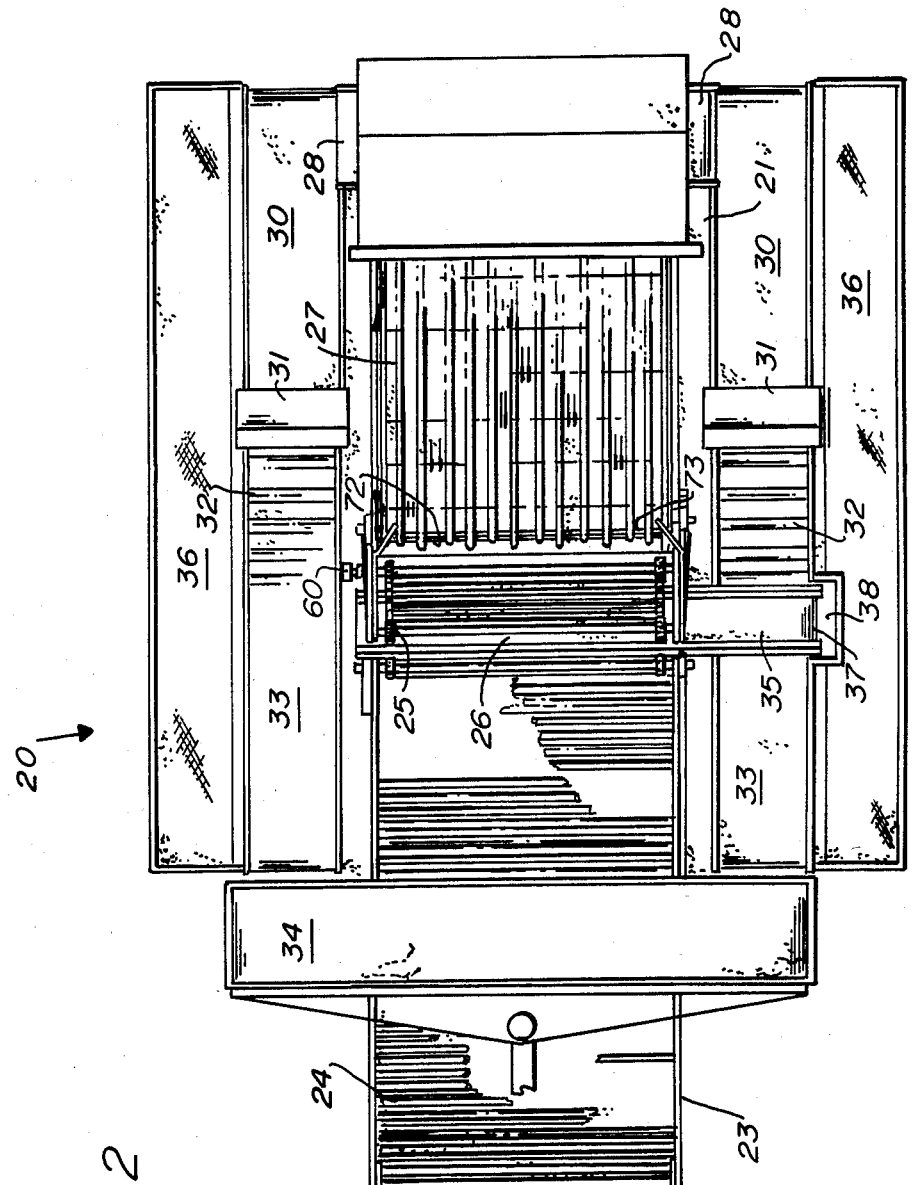
FIG. 2 is a top plan view of the harvester of FIG. 1.

General overall description (FIGS. 1 and 2)

A tomato harvester 20 embodying the principles of this invention is illustrated in the drawings, although other embodiments are possible. For example, the harvester 20 is towed by an independent tractor, but the invention applies also to self-propelled harvesters. A main frame 21 is supported on the wheels 22. The frame 21 supports a forward pickup sub-assembly 23 having a lower elevator segment 24. An upper elevator segment 25 (see also FIGS. 3 and 4) is supported by the main frame 21 above a loose-tomato and clod separator gap 26. The upper elevator segment 25 leads to a shaker sub-assembly 27. A pair of rear cross-conveyors 28 lead to forwardly moving sorting conveyors 30. Each of the conveyors 30 moves the tomatoes to an opto-electrical mechanical sorter 31, from which they go by an elevator conveyor 32 and a forward conveyor 33 to a discharge cross-conveyor 34.

Figure 3:
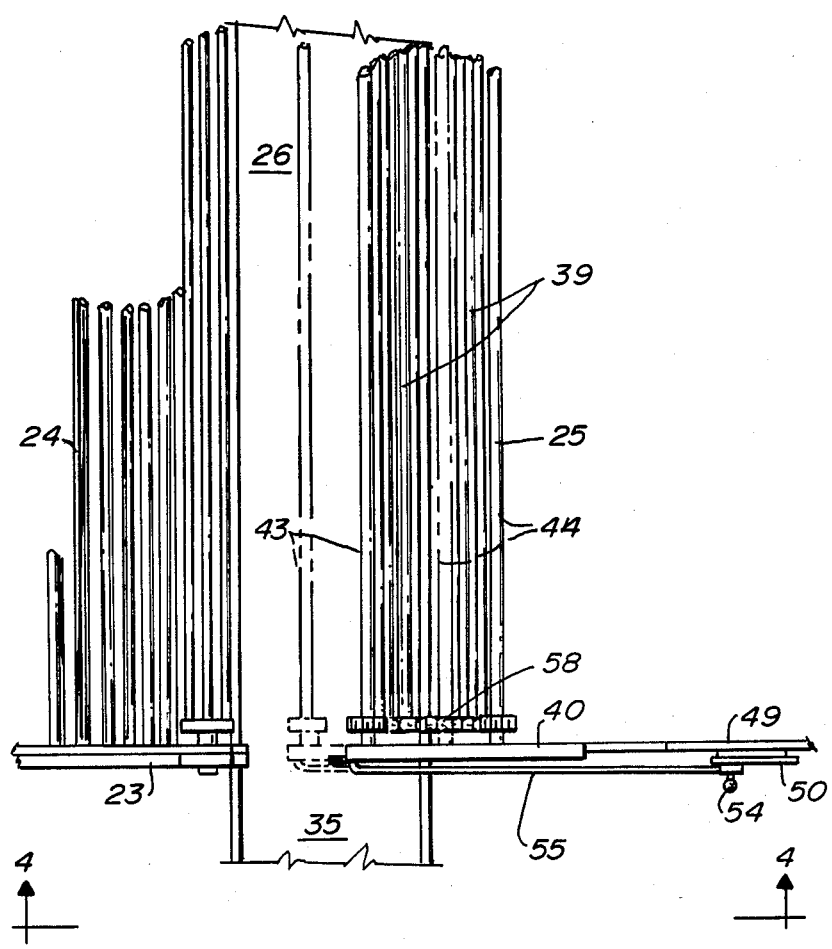
FIG. 3 is an enlarged fragmentary top plan view of the tomato harvester elevator system at and near the gap through which the clods drop, showing in broken lines an alternative position of the upper elevator segment.
Figure 4:
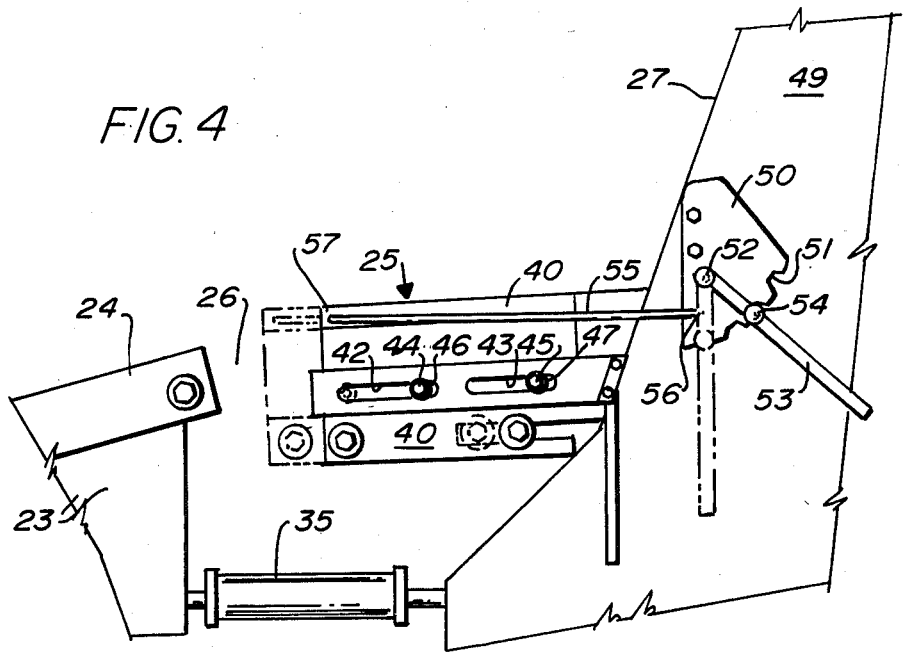
FIG. 4 is a fragmentary view in side elevation of the structure of FIG. 3, again showing in broken lines an alternative position of the upper elevator segment.

Clod separation and the upper conveyor (FIGS. 3 and 4 along with FIGS. 1, 2, and 5)

The separation of the clods and some loose tomatoes is achieved by the gap 26 between the upper end of the pickup elevator segment 24 and the lower end of the upper elevator segment 25. One or more clod conveyors 35 below the gap 26 move the material falling thereon out to one or both sides. A sorter standing on one of two platforms 36 manually transfers good tomatoes to the conveyors 33. The clods fall off the end 37 of the conveyor 35 and down a chute 38 to the ground.

The main or lower elevator 24, preferably a chain-driven spaced rods type of conveyor is mounted as heretofore on the pickup sub-assembly 23. In the present invention, the short upper elevator segment 25, also preferably a chain conveyor with spaced rods 39 (see FIGS. 3 and 5), is supported by a separate movable frame having a pair of side frame members 40 (see FIG. 4) rigidly connected together. Side plates 41 are welded to the main frame 21 (or shaker frame if that is a separate member) and form stationary supports for the movable frame side frame members 40. Slots 42 and 43 in each plate 41 support bolts or studs 44 and 45 and spacers 46 or 47 so that they can slide back and forth in the slots 42 and 43. These bolts or studs 44 and 45 are secured rigidly to the side frame members 40.

On a side wall 49 of the shaker 27 is secured a stationary plate 50 having a series of notches 51 arranged along an arcuate path. Pivoted to the plate 50 by a pivot pin 52 is a handle 53 having a cog or detent 54 which can be lifted outwardly for disengagement and pressed in for engagement in any one of the notches 51. A rod 55 is pivoted at one end 56 to the handle 53 and at its other end 57 to the side frame member 40; the latter connection may simply comprise an inturned end of the rod 55 extending through an opening in the member 40. Thus, when the handle 53 is moved, the rod 55 moves the frame for the conveyor 25, and the frame can be held there when the cog 54 is engaged in a notch 51.

The conveyor of the upper elevator segment 25 includes a pair of chains 58 carrying the spaced rods 39 and driven by a motor 60 (FIGS. 2 and 5) through a sprocket 59 coupling one of the chains 58 to the hydraulic motor 60 so that the conveyor 25 can be driven whatever the position of the frame 40. The effect of moving the handle 53 is to move the entire upper elevator segment 25, either to the right in FIG. 4 or to the left. Movement to the right widens the gap 26; movement to the left narrows the gap 26. The adjustment is made within the limits provided, so that it can accommodate a wide variety of soil conditions which affect the size of the clods.

The shaker and the vine retarders

The shaker assembly 27 comprises a series of walking bars 70, 71 which may be shaped as shown in many prior tomato harvester patents. The walking bars 70 and 71 accomplish the shaking action which provides the principal means for separation of the tomatoes from the vines to which they are attached.

The forward end of each walking bar 70 or 71 is pivotally mounted to a respective shaft 72, 73 at the front of the shaker 27, and the rear end of each is secured to a crank pin 74 or 75 on a crankshaft 76. As will be clear from later description, the walking bars 70 and 71 alternate so that each one is mounted to a crank pin 180° out of phase with the crank pin of the adjacent walking bar on each side. Thus, the bars 70 and 71 operate 180° out of phase in their movement up and down. The amplitude of this vertical movement increases toward the rear of the shaker 27 to a maximum indicated by the throw of the crankshaft 76.

As the vines move through the shaker 27, from front to rear, after having been deposited there from the upper elevator segment 26, they are acted upon by the increasing amount of shaking so that by the time they reach the rear of the shaker 27, substantially all the tomatoes that are recoverable should have been shaken loose. However, sometimes the vines tend to bounce along and go the full length of the shaker 27 so quickly so that not all of the recoverable and desirable tomatoes are shaken loose. This depends partially on the tenacity of attachment of the tomatoes, which varies according to growing conditions, as well as on other factors, and no harvester can be assured that such a variable condition can always be compensated for in advance. Hence, the present invention provides means for adjusting the dwell time of the vines in the shaker 27.

As shown, especially in FIGS. 5–7, a series of transverse rods 80 extend across the shaker 27 well above the walking bars 70 and 71. At their opposite ends, these are mounted to flat bars 81 and 82. On the rods 80 tines 83 are rigidly mounted. The tines 83 may be made of steel, and although they are somewhat rigid, they are flexible at their outer ends by virtue of their length from their support. They extend out rearwardly from their rods 80 and preferably have a bend or hook 84 near their outer end. The flexibility helps them to act with a type of spring action which helps to free them from the plants, or to free the plants from them. It also helps to avoid damage to any tomatoes they may come against. Since each tine 83 extends to the rear of the rod 80 to which it is mounted, it is not likely to impale any of the tomatoes.

As said, each of the rods 80 is secured at one end to one of the flat bars 81 and 82, which, in turn, are pivoted to a series of short vertical bars 85, and these vertical members are, in turn, pivotally attached to another pair of longitudinally extending bars 86 and 87.

The bar 86 is attached by a suitable pivoted member 90 to a short bar 91 at one side of the shaker assembly 27, and is also pivoted to the frame by a pin 92 at its rear end. The bar 91 is pivotally attached to a handle 93. This handle 93 is provided with a detent or cog 94 that can be lifted out a short distance and pressed in to disengage it and re-engage it in any of various notches 95 of a serrated arcuate locking plate 96 secured to a side late of the shaker 27. The handle 93 may, therefore, be manipulated, when the detent 94 is disengaged from one notch 95, so that it can be moved and the detent 94 then engaged in another notch 95. The effect of this is to move the bars 86 and 87 fore or aft, and as a result to move the bars 81 and 82, resulting in rotation of all the rods 80 and rotation of the tines 83 which are mounted upon them.

Two positions are shown in FIGS. 6 and 7. The FIG. 6 position provides a near-maximum engagement of the tines 83 with the vines. The FIG. 7 position results in a minimum amount of engagement. Thus, when the tines 83 are in the FIG. 7 position, the vines go through the shaker 27 relatively rapidly, as compared with what happens when tines 83 are in their FIG. 6 position, which gives a longer dwelling time. This simple expedient of being able to rotate the tines 83, enables the degree of retarding to be changed very simply, even while the harvester 20 is in operation, to obtain a desired dwell time for the vines.

In addition (as shown best in FIG. 7) there is another handle 97 pivoted to the front end of the bar 96, having its notched plate 98 and cog 99, by which the forward end of the bars 86 and 87 can be raised and lowered about the rear pivot 92, thereby raising or lowering the cross-bars 80 and the tines 83. Those tines 83 nearer the front are raised and lowered more than the rear tines 83.

The crank shaft operation (FIGS. 8–11)

The crankshaft 76, as stated above, comprises a series of crank pins 74 and 75 180° apart to which the walker bars 70 and 71 are attached. There are as many bars 70 as bars 71, but the two series are offset from each other, so that the series of bars 70 begins at the left end of the crankshaft 76, at the next-to-the-last crank pin 74, while the series of bars 75 begins one crank pin over from the left end and extends all the way to the last pin on the right.

As stated above, crankshaft balance is important, and in the present invention this is achieved partly by utilizing four timing journals 100, 101, 102, and 103 instead of the two usually employed. These timing journals 100, 101, 102, and 103 are located at 90° to the crank pins 74 and 75 and 180° to each other. Thus, the #1 and #4 journals 100 and 103 are in their rearmost position when the #2 and #3 journals 101 and 102 are in their forward rest position, and this relationship is followed throughout the rotation. The #1 and #3 timing journals 100 and 102 develop one force couple, while the #2 and #4 timing journals 101 and 103 develop a different force couple, and the two force couples basically tend to balance each other. Similarly, the four pins 74 and the four pins 75 develop a force couple F1 which is substantial. The balance is therefore not complete; so counterweights 104 and 105 are added to complete the balancing by adding an equal and opposite force couple F2.

The counterweights 104 and 105 may be secured to crank arms 106 and 107 as shown in FIG. 11, and are heavy enough to do their job.

As said, the timing journals 100, 101, 102, and 103 are needed to assure that the crankshaft 76 will continue to rotate in one direction only, and will not tend to reverse or back up. The counterweights 104 and 105 complete the balancing by balancing their force couple F2 against the crank pin force couple F1.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. A tomato harvester of the type having a main frame with severing means at a forward end for severing tomato plants below ground, pickup and elevating means for picking up and elevating the severed plants; a tomato separator to the rear of the pickup and elevating means for separating the tomatoes from the vines, and collecting means below said separator for collecting said tomatoes, including in combination:

said pickup and elevating means comprising at least two elevator segments, a lower segment extending from said forward end to a rear end and an upper segment spaced from said rear end of said lower segment to provide a gap and extending to said separator to introduce tomato vines into the separator, said gap between them providing an area through which dirt clods and some loose tomatoes can fall, clod conveyor means below said gap for receiving said clods and tomatoes, said upper elevator segment having frame means mounted for movement fore and aft relative to said main frame, first handle means pivotally mounted to said main frame and connected to said upper elevator frame means for effecting said fore and aft movement, first detent means mounted on said first handle means, first locking means secured stationary relative to said main frame having a series of first notches in which said first detent means can engage, first means for engaging and disengaging said detent means in any said first notch, said shaker having two alternating series of walking bars mounted pivotally at the forward end of the shaker and mounted on a crankshaft at the rear of the shaker, on crank pins 180° apart for the two series of alternating arms, said crank pins thereby forming a force couple, a first pair of longitudinally extending bars, one at each side of the shaker, a series of rods extending across said first pair of bars above said walking bars, a series of tines mounted on each rod and extending generally rearwardly and downwardly therefrom and secured at each end to one of said first pair of bars, a second pair of longitudinally extending bars, each pivoted to said frame and connected to one of said first pair of bars by a series of normally vertical members that are pivotally mounted to each of their said bars, second handle means secured to one of said second bars and having second detent means, stationary second locking means having second notches in engagement with the second detent means whereby the second bars can be moved somewhat fore and aft to accomplish rotation of the rods and their tines to vary the dwell time of vines within the shaker, third handle means secured to the forward end of one of said second bars and having third detent means, stationary third locking means having third notches for engagement with the third detent means so that the forward ends of the second bars can be moved up and down to bring the tines down closer to said walking bars or up farther from them, said crankshaft having at each end a pair of timing journals extending at 90° to the crank pins with the outside said journals being located 180° with respect to the two journals mounted inwardly thereof, to provide two force couple in balance, and a counterweight secured to said crankshaft at each end, the two counterweights forming a force couple equal in magnitude and opposite from the force couple resulting from the crank pins.

2. A tomato harvester of the type having a main frame with severing means at a forward end for severing tomato plants below ground, pickup and elevating means for picking up and elevating the severed plants; a tomato separator to the rear of the pickup and elevating means for separating the tomatoes from the vines, and collecting means below said separator for collecting said tomatoes, including in combination:

said pickup and elevating means comprising at least two elevator segments, a lower segment extending from said forward end to a rear end and an upper segment spaced from said rear end of said lower segment to provide a gap and extending to said separator to introduce tomato vines into the separator, said gap between them providing an area through which dirt clods and some loose tomatoes can fall, clod conveyor means below said gap for receiving said clods and tomatoes, said upper elevator segment having frame means mounted for movement fore and aft relative to said main frame, handle means pivotally mounted to said main frame and connected to said upper elevator frame means for effecting said fore and aft movement, detent means mounted on said handle means, locking means secured stationary relative to said main frame having a series of notches in which said detents can engage, and means for engaging and disengaging said detent means in any said notch.

3. A shaker for tomato harvester, comprising:

a shaker frame, having side members, two alternating series of walking members in said frame, a first pair of longitudinally extending bars, one at each side of the shaker, near said frame side members, a series of rods extending across said first pair of bars above said walking members and secured at each end to one of said first pair of bars, a series of tines mounted on each rod and extending generally rearwardly and downwardly therefrom, a second pair of longitudinally extending bars, each pivoted to a said side member of said frame at a rear end and connected to one of said first pair of bars by a series of normally vertical members that are pivotally mounted to each of their said bars, first handle means secured to one of said second bars and having first detent means, stationary first locking means having first notches for engagement with the detents, whereby the bars can be moved somewhat fore and aft to accomplish rotation of the rods and their tines to vary the dwell time of vines within the shaker, second handle means secured to a forward end of one of said second bars and having second detent means, and stationary second locking means having second notches for engagement with the second detent means, so that the forward ends of said second bars can be moved up and down to bring the tines down closer to said working members or up further from them.

4. A shaker for a tomato harvester comprising:
a crankshaft at the rear of said shaker having two series of crank pins, that of one series being located 180° apart from those of the other series, said crank pins thereby constituting a first force couple,
two alternating series of walking bars mounted pivotally at the forward end of the shaker and mounted on said crank pins at the rear of said harvester, said crankshaft having at each end of a pair of timing journals extending at 90° to the crank pins with the outside said journals being located 180° with respect to the two journals mounted inwardly thereof, to provide two more force couples in balance, and
a counterweight secured to said crankshaft at each end, the two counterweights forming a force couple equal and opposite to said first force couple.

* * * * *